June 26, 1951 A. P. DURON 2,557,953

TELEPHONE RINGING GENERATOR

Filed Sept. 29, 1949 5 Sheets-Sheet 1

INVENTOR
ANTONIO P. DURON
BY Percy P. Lantzy
ATTORNEY

June 26, 1951 A. P. DURON 2,557,953

TELEPHONE RINGING GENERATOR

Filed Sept. 29, 1949 5 Sheets-Sheet 2

INVENTOR
ANTONIO P. DURON
BY Percy P. Lantz
ATTORNEY

June 26, 1951 A. P. DURON 2,557,953

TELEPHONE RINGING GENERATOR

Filed Sept. 29, 1949 5 Sheets-Sheet 3

INVENTOR
ANTONIO P. DURON
BY Percy P. Lantzy
ATTORNEY

June 26, 1951 A. P. DURON 2,557,953

TELEPHONE RINGING GENERATOR

Filed Sept. 29, 1949 5 Sheets-Sheet 4

INVENTOR
ANTONIO P. DURON
BY Percy P. Lantzy
ATTORNEY

June 26, 1951 A. P. DURON 2,557,953

TELEPHONE RINGING GENERATOR

Filed Sept. 29, 1949 5 Sheets-Sheet 5

INVENTOR
ANTONIO P. DURON
BY Percy P. Lantzy
ATTORNEY

Patented June 26, 1951

2,557,953

UNITED STATES PATENT OFFICE 2,557,953

TELEPHONE RINGING GENERATOR

Antonio P. Duron, South Orange, N. J., assignor to Federal Telephone and Radio Corporation, New York, N. Y., a corporation of Delaware Application September 29, 1949, Serial No. 118,543

7 Claims. (Cl. 171—209)

This invention relates to a generator of the type used to produce ringing current at a telephone subscriber's subset. The generator is capable of being received in the space normally required by a dial in such subsets and is designed to provide a maximum ringing current with a minimum amount of rotor rotation.

In generators of this type which are known, it has been necessary to sacrifice to a certain extent many of the desirable operating characteristics obtainable because of the relatively critical limitations in regard to size and weight. This sacrifice has resulted primarily from the consistent tendency to apply "large generator design" principles on a much smaller scale to the design of the small generators, with very little individual engineering being applied. Constructional features which result in almost negligible losses in a large generator when applied to small generator design, have been found to result in very inefficient machines because of the relatively critical requirements of the small machines. These known generators are not readily produced in large quantities because of the skilled workmanship required in performing such operations as armature winding and precision machining. The output wave-form of the machines are very uneven and are characterized by objectionally high peak voltages. The starting torque is relatively high and therefore necessitates heavy gearing and drive shafts. Furthermore the machines operate within a very narrow frequency range which is not suitable for use in diversified systems.

In accordance with this invention there is provided a generator of the class described which lends itself readily to mass production methods of manufacturing and which incorporates a combination of novel features which are instrumental in overcoming the disadvantages of those generators heretofore in use.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
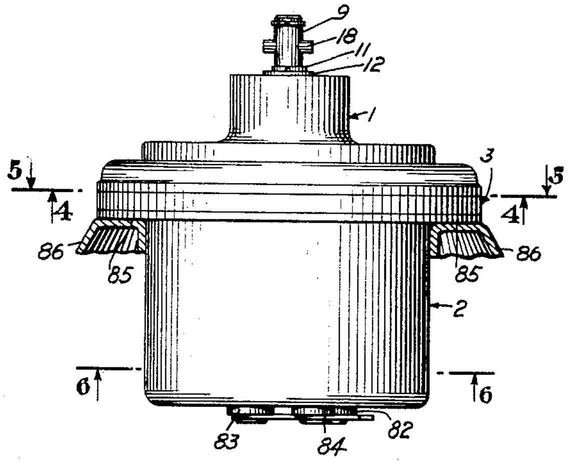
Figure 1 is a side view of the assembled generator.

In order to avoid complex and intricate windings which necessarily increase the manufacturing cost of this type of generator beyond a practical limit, they are usually made of the rotating armature type, or the permanent magnet rotor type. The rotating armature type, which is a wound armature, offers many good features; however, these features are more than offset by the following disadvantages;

(1) They require collector rings from armature windings;

(2) The space is limited for the magnetic path of the armature segments; and (3) The space is limited for the coil windings.

These three objectionable features may be discounted in cases where size, shape and weight are of secondary importance but in the case of these small type generators the problems imposed by the disadvantages are not easily overcome. For this reason the magnet rotor type of generator is most ideally suited to the exacting demands.

It may be seen from the basic formula:

$$F=P/Z\times \text{R. P. M.}/60$$

where $F$=frequency and $P$=the number of poles that the greater the number of poles, the smaller will be the gear ratio required; and the rotor will operate at lower speeds. However, multipolar machines require more coils and pole pieces, thereby increasing the magnetic leakage; and also the magnetic reluctance since any mounting of pole pieces to a yoke creates unwanted air gaps that increase the reluctance of the magnetic circuit. In view of these conflicting advantages and disadvantages it is believed that the bi-polar type of machine is most readily adaptable to the size and weight requirements, further it is most suitable for inexpensive mass production and it is possessive of good operational characteristics.

In the embodiment of my invention illustrated in the drawings I have shown a bi-polar machine of the magnet rotor type; however a great many variations from this embodiment may be made without departing from the scope of my invention.

With reference to the drawings and in particular to Figure 1 the generator of my invention is mounted within a substantially cylindrical moisture-proof shell comprising an upper housing 1 and a lower housing 2. The upper and lower housing are joined to a common plate member 3 by means of the bolts 4 which are best seen by reference to Figure 8.

The plate member 3 is provided with upper and lower circumferentially recessed portions 5 and 6 respectively, which are adapted to receive gasket members 7 and 8, respectively. The gasket members 7 and 8 insure a moisture proof seal between the upper and lower housing joints on the common plate 3.

Figures 2, 3:
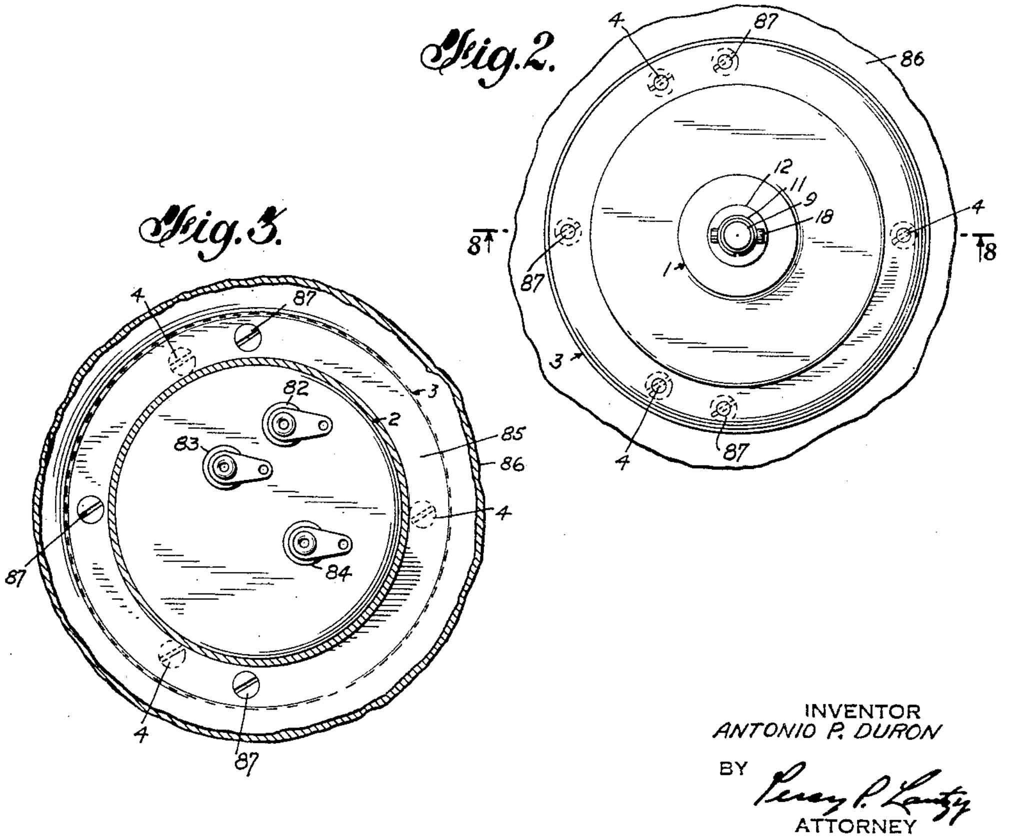
Figure 2 is a plan view of the generator as shown in Figure 1.
Figure 3 is a bottom view of the generator as shown in Figure 1.
Figure 4:
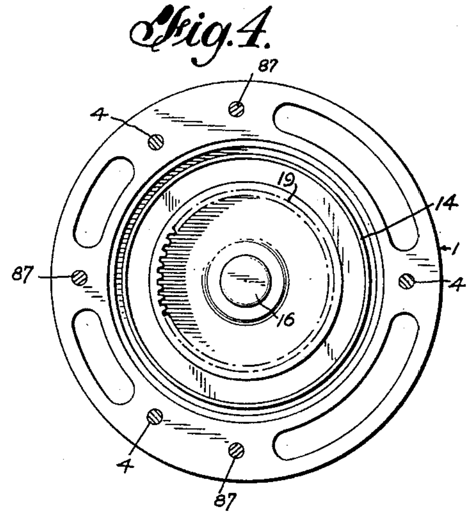
Figure 4 is a sectional plan view of the generator taken along the line 4—4 of Figure 1, showing the main drive gear carried in the upper housing of the generator.
Figure 8:
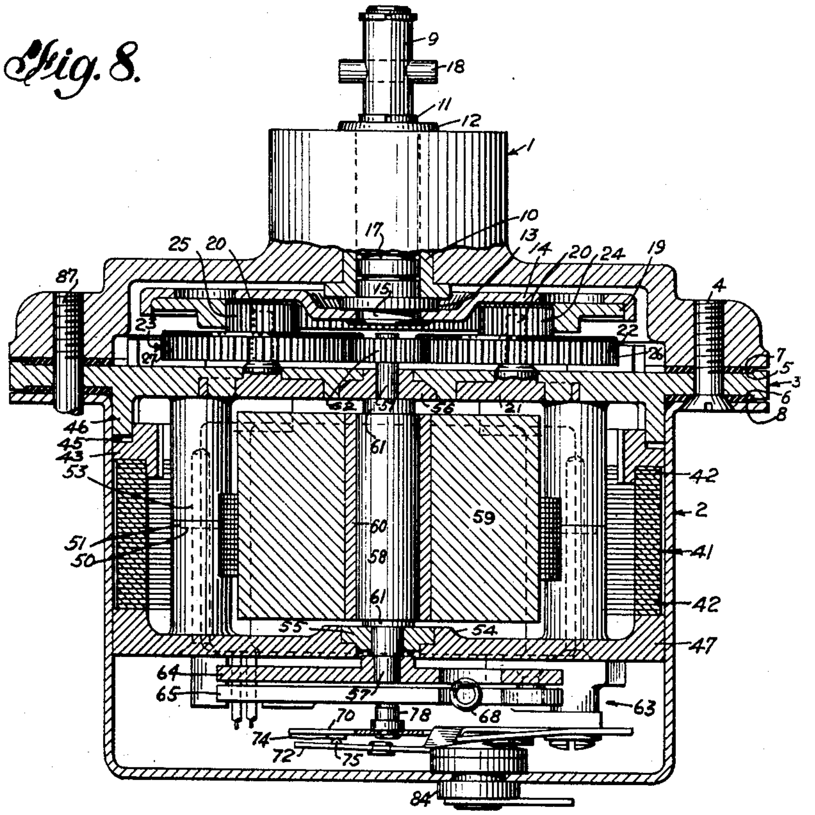
Figure 8 is a detailed side view of the assembled generator, mostly in section illustrating the internal structure of the machine.

The upper housing of the generator as seen in Figures 1, 2 and 8 carries a drive shaft 9 which extends through a bearing sleeve 10. The shaft is held within the housing by means of the retaining ring 11, which rides on a washer 12 disposed between the retaining ring and the housing top.

There is formed integral with the shaft the stop ring 13, Fig. 8 which lies between the end of the bearing sleeve 10 and a rotator member 14 thus retaining the shaft axial within the upper casing. The lower end of the drive shaft 9 may be attached to the rotator member in any desirable manner, as by means of a flat side of sides on the shaft which fit into a suitably shaped opening in the rotator member, as is shown at 15 and the shaft may be secured to the rotator member by spinning the lower end of the shaft over the lower face of the rotator member, as indicated at 16.

The shaft 9 may be provided with lubrication grooves 17 at those points on the shaft which ride within the bearing sleeve 10. The upper end of the shaft 9 may be fitted with a cross member 18 for engagement with a crank in a well known manner.

The rotator member 14 carries a ring gear 19 which is spot-welded or secured in any other suitable manner to the rotator member 14.

It may be seen from the above consideration of the upper housing mechanism that rotation of the drive shaft 9 in either direction will result in a rotation of the member 14 and the ring gear 19 carried thereon.

Figure 5:
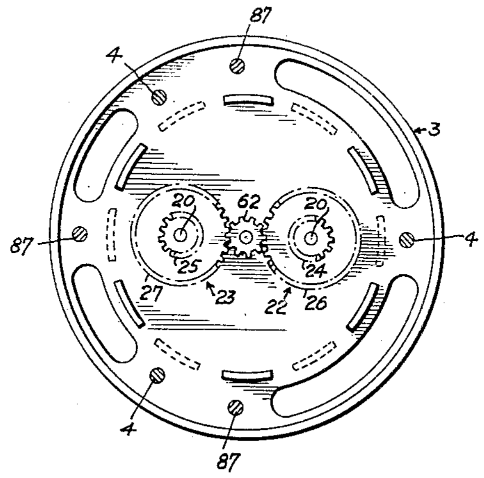
Figure 5 is a sectional plan view of the generator taken along the line 5—5 of Figure 1, showing the planetary gearing carried in the lower housing of the generator.

The ring gear 19 is adapted to engage additional gears carried by the plate 3, which in turn impart rotation to the generator rotor as will now be explained with reference to Figures 5 and 8.

In Figure 8 it may be seen that the common plate member 3 is provided with pin members 20 on either side of the central axis of rotation of the drive shaft. These members are secured in any suitable manner within recessed portions of the plate 3 as shown at 21, and extend above the upper face of the plate 3. The pins are adapted to receive identical planetary gears 22 and 23. The planetary gears are mounted over the respective pin members 20 and are free to rotate thereon. The upper gear members 24, 25 of the planetary gear sets are adapted to mesh with the ring gear 19 carried by the rotator member 14. The rotation imported to the upper planetary gears by the ring gear, in turn drives the two identical lower planetary gears 26, 27 as shown in Figure 8.

It will be necessary to describe the novel construction of the generator carried in the lower housing 2 of the generator casing before any consideration may be given to the cooperation of the above described drive mechanism and the rotor of said generator.

Figure 12:
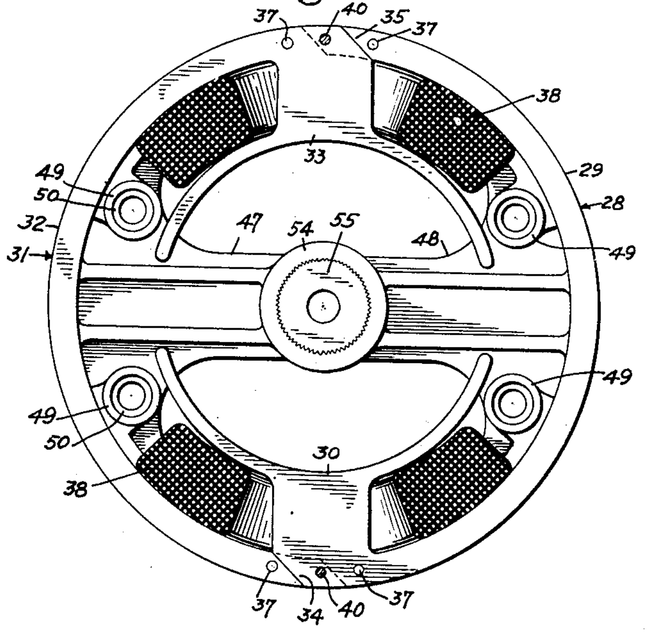
Figure 12 is a sectional view of the stator illustrating the laminated interleaving of the pole pieces and the coil arrangement thereon.

It has been found that attachment of separate pole pieces to stator yokes produces an objectional air gap which greatly increases the reluctance of the magnetic path. On the other hand those generators which utilize solid construction of the stator yoke and pole pieces are subject to objectional hysterisis and eddy current losses which reduce the generators' efficiency. These effects are greatly reduced in the generator of my invention by utilizing a novel method of stator construction. This construction will be explained with reference to Figures 12 and 13.

Figure 13:
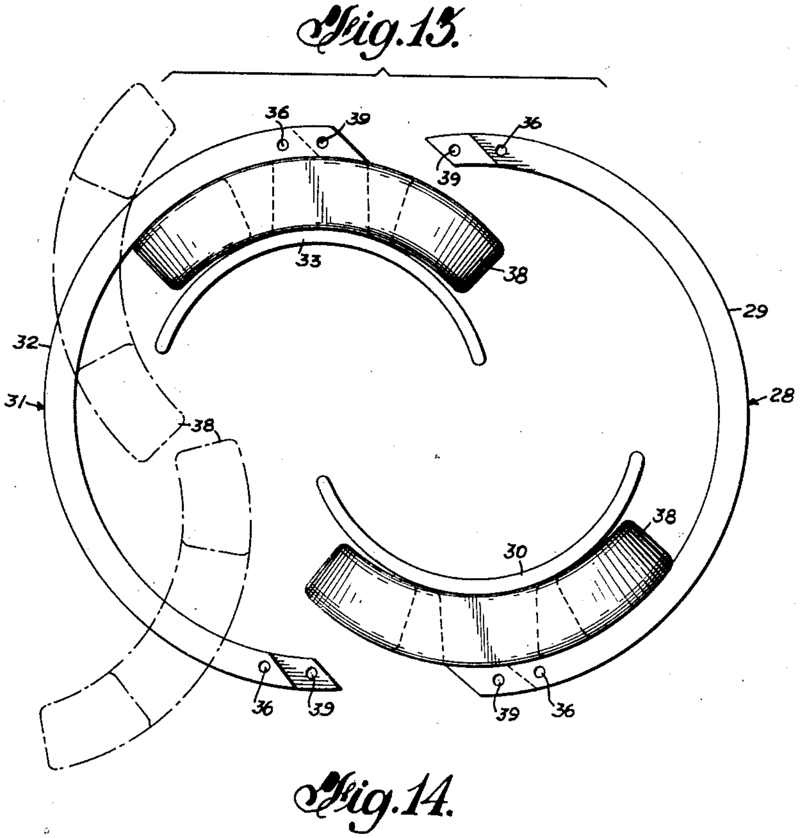
Figure 13 is an exploded view of the laminated pole pieces prior to assembly.

In Figure 13 semi-circular segment 28 comprises the stator built up from a series of thin laminated segments, each segment of which carries a complete cross-sectional portion of one pole piece. In Figure 13 the semi-circular segment 28 comprises one half of the stator yoke 29 and a portion of one pole piece 30. The semi-circular segment 31 similarly carries the remaining half portion of the stator yoke 32 and a portion of an opposing pole piece 33. The two segments when assembled comprise one lamination of the entire stator.

Each half segment of the stator is provided with an overlapping extension at one of the two edges at which it contacts the opposing half segment of said stator and is cut back at the other edge. For example, in Figure 12, the segment 28 is provided with the extension 34 at one end and is cut back at its other end as shown by reference numeral 35. The opposing half segment of the stator as denoted by 31, is provided with an extension which butts against the cut back end 35 of the segment 28 and is cut back at its other end to butt against the edge 34 of the extension carried by segment 28. Alternate segments are provided with reversed cut-back and extended portions to effect an interlacing of the laminations. In this manner it is seen that any possible air gap is eliminated at the junction points of the two half segments and the resulting interlacing of the stator segments provides an unbroken flux path. There is no reluctance due to an air gap formed at the junction of the stator yoke and pole pieces since these pieces are formed integral on each lamination and built up with a plurality of such laminations.

The individual laminations of each stator half are secured together in a manner best illustrated by reference to Figures 14 and 15. The individual laminations forming each one half of the stator are provided with the holes 36 and are joined by means of pin members 37 which are inserted in the holes. The pins 37 are then cut off flush with the upper and lowermost segments of the stator stack as viewed in Figure 15.

The coil members 38 completely pre-wound, are easily mounted on the laminated stator halves before the halves are combined as illustrated in Figure 13. The coils are slipped over the free end of the stator halves, as indicated in the dot and dash views of Figure 13, and then set in place behind the pole pieces.

Figure 14:
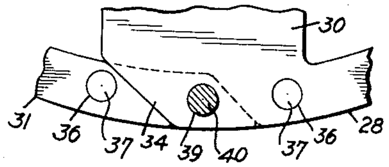
Figure 14 is a detailed partial plan view of the pole piece joints after assembly and, Figure 15 is the detailed view of Figure 14 in a side view relationship showing the pin joints of the stator.
Figure 15:
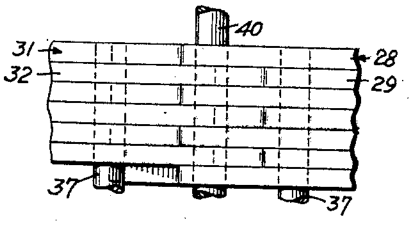

The individual laminations forming each one-half of the stator, with a field coil mounted thereon are then assembled as shown in Figures 14 and 15. The half segments are interleaved until the holes 39 which are provided in the extended portions of the laminations are aligned, at which time the pin member 40 is inserted in said hole.

Although this type of stator construction greatly reduces the reluctance of the magnetic path I have found that by supplying additional laminations of a solid circular pattern above and below the assembled stator, there is provided an unrestricted return path for the flux produced in the stator. This is best illustrated with reference to Figure 9.

Figure 9:
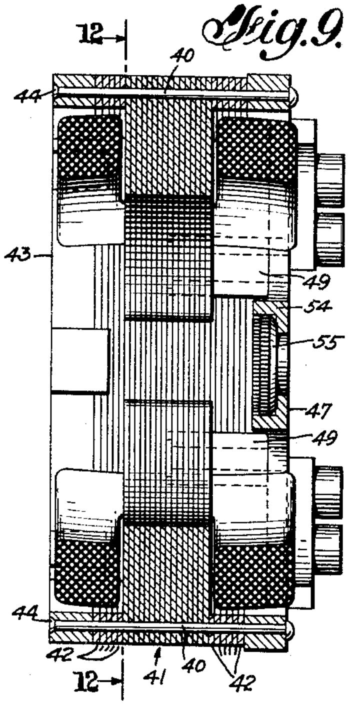
Figure 9 is a partial sectional view of the generator, turned at 90° from the view of Figure 8 and illustrating the stator construction and field winding arrangement.
Figure 11:
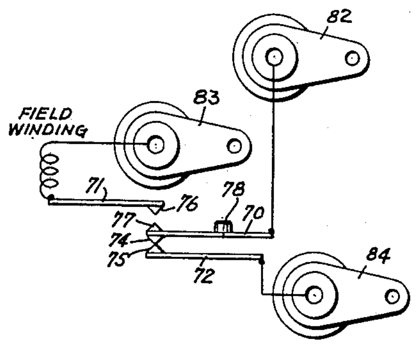
Figure 11 is a schematic representation of the contact arrangement carried by the centrifugal switch.

As has been stated above the pin members 37 which join respective laminations of each half stator section prior to assembly are cut off flush with the top and bottom laminated segments but the pins 40 are extended a set distance on either side of the laminations making up the pole stack, as shown in Figure 9. On the top and bottom of the laminated pole stack assembly 41, additional laminations 42 which are coplanar with the stator yoke, are mounted upon the extended pins 40. These laminations are not broken as are those forming the pole piece stack of the stator and extend completely around the stator yoke. This provides a continuous, low reluctance path for the flux produced in the stator as explained above.

The complete laminated stator is then attached to a core clamp 43 having substantially the same configuration as the stator yoke at the upper edge by extending the pins 40 through holes provided in the core clamp and riveting over the ends of the pins flush with the surface of the clamp, as illustrated at 44 in Figure 9. The core clamp 43 is provided with recesses 45 in the side walls which are adapted to receive circumferentially disposed perpendicular extensions 46 provided on the common plate member 3 as shown in Figure 8, thereby securely aligning the stator with the plate 3.

Figure 10:
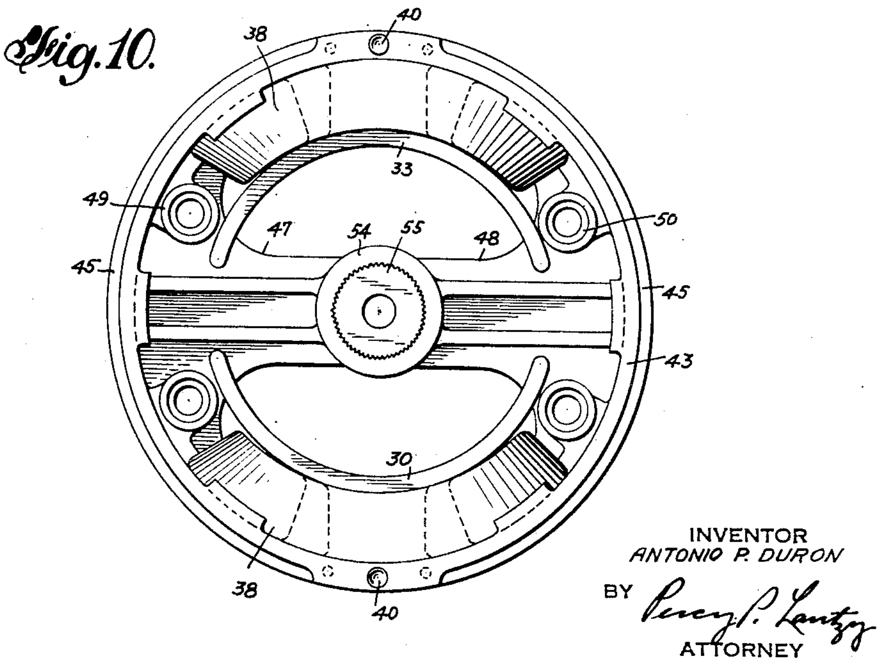
Figure 10 is a plan view of the stator with the field coils mounted thereon.

The other end of the assembled stator stack is secured to a stator base 47 similar to the stator clamp 43 by extending the pins 40 through holes provided in the base 47 and riveting the pins over the face of the base. The stator base is provided with means for securing the stator to the plate 3 as will be explained with reference to Figures 8, 9 and 10.

The base member has a yoke 48 extending across the diameter of the stator, this yoke being wider where it joins the base member than at the center. At these wide portions of the yoke 48 where the yoke flanges into the base plate 47, four built-up shoulders 49 are provided which extend from the yoke up into the stator stack at points between the stator pole pieces and the stator yoke, as best seen by reference to Figures 9 and 12. The shoulders 49 are recessed at their upper ends 50, Figure 8, and are adapted to engage four similar shoulders 51 extending from the common plate 3. The shoulders 51 have mating extensions 52 which engage the recesses 50 in the shoulders 49. This type of construction insures the proper alignment of the generator parts which is of utmost importance. The generator will not operate efficiently if the electrical and geometric centers of the rotor are out of alignment.

The shoulders 49 extending from the base plate are drilled to receive the bolts 53, while the shoulders 51 are internally tapped to receive the bolts which securely attach the stator to the plate member 3.

The midpoint of the yoke 48 is built up as shown by 54 and recessed to receive a press-fit bearing 55 of hardened steel. In like manner the plate member 3 is recessed at its midpoint to receive the bearing 56 of similar material.

The bearings 55 and 56 are center drilled to receive the extensions 57 of the rotor shaft 58. The rotor 59 is preferably made of "Alnico V," an alloy of nickel and aluminum or any other suitable magnetic material and is press fit to the shaft 58 by means of the sleeve 60. The slightly reduced sections 61 of the rotor shaft 58 rests against the bearings 55 and 56 at the upper and lower points of the rotor.

The rotor 59 is of substantially cylindrical shape and may be of solid or lightened construction according to the weight requirements. The rotor is highly magnetized preferably at a time when all machine and cutting operations have been completed as these operations have a tendency to alter the magnetization of the piece. After magnetization the rotor will possess a north seeking pole on substantially one half of its cylindrical surface and a south seeking pole on its remaining half cylindrical surface, with the neutral axis of magnetization being on a plane through the perpendicular connecting the midpoints of its circular ends.

At the upper extremity of the rotor shaft as viewed in Figure 8, there is attached to the shaft the gear 62 which meshes with the gears 26 and 27 of the planetary gears 22 and 23. The gearing arrangement is such that a slight rotation of the shaft 9 will result in a relatively large rotation of the rotor 59. The planetary gearing insures that a balanced torque will at all times be applied to the rotor, thereby eliminating the possibility of uneven wear on the bearing resulting in "wobble" rotation of the rotor.

In the application of this type of generator it is necessary to supply some type of governing means which will determine the most favorable voltage level at which the current generated will be sent into the line circuit. To fulfill this need I utilize a centrifugal switch which is a modified form of a known type and which will be discussed briefly to illustrate its operational tie-in with the generator.

Figure 6:
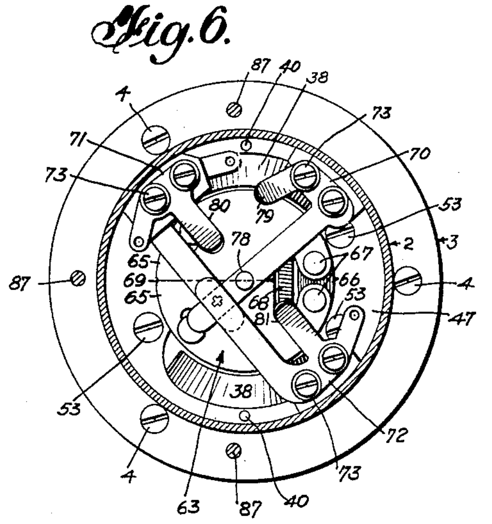
Figure 6 is a sectional view taken along the line 6—6 of Figure 1, illustrating the centrifugal switch of the generator in an unoperated position.
Figure 7:
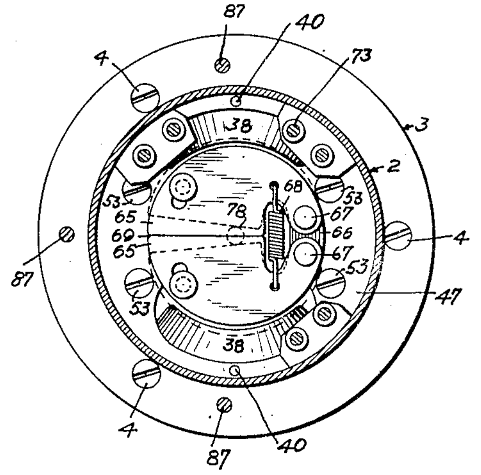
Figure 7 illustrates the centrifugal switch in an operated position.

With reference to Figures 6, 7 and 8 the centrifugal switch 63 comprises a plate 64 which is attached to the rotor shaft 58 at an extension below the base plate 47. The switch comprises the two identical semi-circular segments 65 which are each pivotally secured to a joining lug 66 by means of the pins 67 at an outer point on their circumference. The two segments are spring urged together by means of the spring 68 attached to the respective plates 65. The switch is free to rotate with the rotor shaft and at a predetermined speed governed by the tension of the spring, the centrifugal force of the plate members will tend to separate the members along the line 69.

Cooperating with the switch are the contact spring members 70, 71 and 72 which are securely mounted to the stator base plate 47 by means of the screws 73 as shown in Figures 6 and 7.

Contact spring 70 carries a contact 74 which is normally held in engagement with a contact 75 carried by spring 72. Spring 71 carries a contact 76 which is normally held out of engagement with a second contact 77 on member 70.

The contact arrangement and the corresponding wiring connections are best illustrated by reference to schematic diagram 11.

Contact spring 70 carries a pin member 78 having champfered sides which is centered in centered in such a manner as to ride on the line of separation 69 of the switch plates 65. When the rotor speed is of such a nature as to force the plates 65 apart, the pin member 78 is spring urged into the separation between the plates. Spring member 70 breaks the contact between contacts 74 and 75 and makes contact between contacts 76 and 77. When the rotor speed is again reduced the pin is forced out of the separation which closes under the action of the spring 68 and normal contact is again established.

The wire connections to the spring contact members 70, 71 and 72 are made through the association of the small spring extensions 79, 80 and 81 which are spring urged into contact with the contact buttons 82, 83 and 84 respectively, carried in the outer housing shell 2 of the generator casing. These buttons as shown in Figure 3 are sealed within the housing and eliminate any possibility of moisture seepage through wire outlets. Contact is automatically established between the buttons and the extensions 79, 80 and 81 when the unit is assembled.

When the governor releases the contacts made and broken are effective to short the ringer at a calling subset and extend the line through the field winding of the generator to a called party.

With reference to Figure 1 the overlapping flange 85 of the common plate 3 is designed to be received in the spaced normally occupied by a dial in an ordinary telephone subset. The telephone subset indicated by 86 in Figure 1 will receive the lower housing of the generator and the dial hole of the set will rest against the flange 85 provided on the plate 3. Any suitable type of mounting means may be employed to hold the generator in the dial hole. The flange 85 may be provided with the holes 87 shown in Figure 2 to receive bolts for securing the generator to the subset.

While I have described above the principles of my invention in connection with specific apparatus, it is to be clearly understood that this description is made only by way of example and not as a limitation to the scope of my invention.

What is claimed is:

1. A stator for a magneto generator comprising two groups of laminations including portions defining pole pieces, means for assembling together said two groups of laminations to provide two spaced apart metallic flux paths connecting said pole pieces, at least one additional lamination providing two metallic flux paths parallel to the two paths provided by the assembly of said two groups of laminations and means to secure said additional lamination closely adjacent the laminations of said two groups.

2. A stator for a magneto generator comprising a first plurality of substantially semicircular laminations each having a complete cross-sectional portion of a pole piece extending therefrom, a second plurality of substantially complementary semicircular laminations each having a complete cross-sectional portion of an opposing pole piece extending therefrom, said first and second plurality of laminations having alternately extended and recessed end portions, means for securing said first plurality of lamination together and means for securing said second plurality of laminations together to form two substantially semi-circular stacks, means for securing said stacks together with alternate extended and recessed portions of one stack engaging alternate recessed and extended portions respectively of the other stack to form a circular laminated assembly, a plurality of substantially circular laminations having the same shape as said laminated assembly and means for securing said laminations to said assembly on either side of said assembly.

3. A stator for a magneto generator comprising two groups of laminations including portions defining pole pieces, means for assembling together said two groups of laminations to provide two spaced apart metallic flux paths connecting said pole pieces, additional laminations each providing two metallic flux paths parallel to the two paths provided by the assembly of said two groups of laminations and means to secure said additional laminations closely adjacent the sides of the assembled groups of laminations.

4. A magneto generator comprising a first casing, a second casing, a common plate member removably secured to said first casing on one side and to said second casing on its other side, a first drive shaft mounted centrally within said first casing and extending partially therefrom, a rotator member secured to said drive shaft within said first casing, a ring gear mounted on said rotator member, a first pair of planetary gears mounted on said common plate and pivotally movable thereon, said planetary gears each being operable to mesh with said ring gear, a laminated stator mounted to said common plate and extending into said second casing, a second drive shaft mounted centrally within said second casing, a rotor mounted on said second drive shaft within said second casing, said second drive shaft extending partially through said common member and being in axial alignment with said first drive shaft, a gear secured to said extended portion of said second drive shaft, a second pair of planetary gears each secured to a respective one of said first planetary gears, said second drive shaft gear being operable to mesh with each of said second planetary gears and means for externally establishing electrical connections to said stator.

5. A stator comprising two groups of laminations including portions defining pole pieces, means for assembling together said two groups of laminations to provide two spaced apart metallic flux paths connecting said pole pieces, additional laminations each providing two metallic flux paths parallel to the two paths provided by the assembly of said two groups of laminations and means to secure said additional laminations closely adjacent the laminations of said two groups.

6. A stator according to claim 5, wherein the laminations of said two groups are generally semi-annular with the portions defining said pole pieces disposed radially inwardly thereof, and the additional laminations are annular in shape.

7. A stator according to claim 5, wherein the laminations of said two groups each include a portion forming a complete lamination of a pole piece.

ANTONIO P. DURON.

REFERENCES CITED

The following references are of record in the file of this patent:

UNITED STATES PATENTS

| Number | Name | Date |
|---|---|---|
| 388,877 | Humans | Sept. 4, 1888 |
| 579,975 | Gillette | Apr. 6, 1897 |
| 644,823 | Heidel | Mar. 6, 1900 |
| 1,061,677 | King | May 13, 1913 |
| 1,314,128 | Croll | Aug. 26, 1919 |

FOREIGN PATENTS

| Number | Country | Date |
|---|---|---|
| 602,436 | France | Dec. 23, 1925 |